(12) United States Patent
Garnett

(10) Patent No.: US 6,509,055 B1
(45) Date of Patent: Jan. 21, 2003

(54) ANIMAL FEED SUPPLEMENT COMPRISING SPECIFIC PHOSPHOLIPID COMPOSITIONS

(75) Inventor: David John Garnett, Ceredigion (GB)

(73) Assignee: Lovesgrove Research Limited, Powys (GB)

( * ) Notice: Subject to any disclaimer, the term of this patent is extended or adjusted under 35 U.S.C. 154(b) by 0 days.

(21) Appl. No.: 09/868,271

(22) PCT Filed: Jun. 29, 2000

(86) PCT No.: PCT/GB99/03743

§ 371 (c)(1),
(2), (4) Date: Sep. 28, 2001

(87) PCT Pub. No.: WO00/36929

PCT Pub. Date: Jun. 29, 2000

(30) Foreign Application Priority Data

Dec. 18, 1998 (GB) .............................................. 9828013
May 14, 1999 (GB) .............................................. 9911191

(51) Int. Cl.$^7$ .............................. A23K 1/16; A23J 7/00
(52) U.S. Cl. ........................ 426/662; 426/805; 426/807
(58) Field of Search ................................ 426/662, 805, 426/807

(56) References Cited

U.S. PATENT DOCUMENTS

| 4,874,553 A | * | 10/1989 | Hager et al. | ................. | 260/403 |
| 4,983,327 A | | 1/1991 | Günther et al. | ............. | 260/403 |
| 5,183,680 A | * | 2/1993 | Jodlbauer | .................... | 426/611 |
| 5,955,327 A | * | 9/1999 | Hirai et al. | ................. | 435/128 |

FOREIGN PATENT DOCUMENTS

| DE | 19529861 A1 | 8/1995 |
| GB | 2 267 033 A | 11/1993 |

\* cited by examiner

*Primary Examiner*—Chhaya D. Sayala
(74) *Attorney, Agent, or Firm*—Thompson Coburn LLP

(57) ABSTRACT

An animal feed supplement composition comprising a phospholipid composition having a specific ratio of components as defined below: Phosphatidylcholine 18±1; Phosphatidylethanolamine 14±1; Lysophosphatidylcholine 1±1; Lysophosphatidylethanolamine 1±1; Lysophosphatidylinositol 2±1. The phospholipid composition provides an improved animal feed which has beneficial effects on animal performance.

6 Claims, 2 Drawing Sheets

ANIMAL FEED SUPPLEMENT COMPRISING SPECIFIC PHOSPHOLIPID COMPOSITIONS

FIELD OF THE INVENTION

This invention relates to specific phospholipid compositions for providing an improved animal feed, particularly compositions prepared from soya bean extracts.

BACKGROUND OF THE INVENTION

Particular soya bean lecithins may be incorporated into animal feeds with beneficial effects on animal performance, especially growth rates. Soya bean lecithin is routinely used as an additive for animal diets, typically in amounts ranging from 0.1 to 3%, and is a permitted emulsifier for this use under EC Feed Regulations. Benefits provided by the lecithin incorporated in the animal feed include increased digestibility of fat and transport of lipids out of the liver. Lecithin may also provide a good source of choline. It is frequently included in compound animal feeds, milk replacers and aquatic diets.

Crude lecithin contains a variety of phospholipids and glycolipids as well as small amounts of phosphatic acid and neutral lipids. The most abundant phospholipids are phosphatidylcholine (PC), phosphatidylethanolamine (PE) and phosphatidylinositol (PI). Phospholipases and lipases produced naturally by certain strains of bacteria, fungi and other organisms, or enzymes extracted from animal pancreas, can be used to achieve a conversion of the phospholipids to their deacylated derivatives known as lysolecithins, such as lysophosphatidylcholine (LPC), lysophosphatidylethanolamine (LPE) and lysophosphatidylinositol (LPI). These lysolecithins have a beneficial impact in animal growth when compared with lecithins (Schwarzer K and Adams C, Lipids 98 [1996] and UK Patent No. 2267033).

It has been known for some time that different lipid mixtures can have important and widely different effects on biological membranes. For example, the active lipid mixture AL721 is synthetically prepared from neutral glycerides, phosphatidylcholine and phosphatidylethanolamine in the ratio of 7:2:1 and has been used to inhibit attachment of viruses to cell surface receptor sites (Effects of Novel Compound (AL721) on HTLV-II Infectivity in vitro. Sarin P; Gallo R; Scheer D; Crews F; and Lippa A. New England Journal of Medicine 313 [1985] No. 20 1289–1290). This precise ratio of lipids appears to permeabilise the membrane and is associated with a decrease in membrane bound cholesterol (A Special Lipid Mixture for Membrane Fluidisation; Lyte M and Shinitzky M. Biochem Biophys Acta 812 [1985] 133–138).

FIELD OF THE INVENTION

It is an object of the present invention to provide new compositions for producing an improved animal feed which have beneficial effects on animal performance, especially growth rates.

A further object of the present invention is to provide new compositions which may be produced from crude lecithin, thereby providing compositions which are cheaper to produce and may be manufactured in bulk.

Accordingly, a first aspect of the present invention provides an animal feed supplement comprising a phospholipid composition having the following components in the ratios given:

| Phosphatidylcholine | 18 ± 1 |
|---|---|
| Phosphatidylethanolamine | 14 ± 1 |
| Lysophosphatidylcholine | 4 ± 1 |
| Lysophosphatidylethanolamine | 1 ± 1 |
| Lysophosphatidylinositol | 2 ± 1 |

Preferably, the ratio of components in the composition is as follows:

| Phosphatidylcholine | 18 |
|---|---|
| Phosphatidylethanolamine | 14 |
| Lysophosphatidylcholine | 4 |
| Lysophosphatidylethanolamine | 1 |
| Lysophosphatidylinositol | 2 |

The composition may include additional phospholipids, such as phosphatidylinositol (PI), acylphosphatidylethanolamine (APE), inositol (PI), diphosphatidyl glycerol (DPG), phosphatidic acid (PA) and lysophosphatic acid (ILPA).

A preferred composition of the present invention has the following empirical formula:

| Phospliolipid | Weight % |
|---|---|
| PC | 9.69 |
| PI | 7.90 |
| LPC | 1.90 |
| PE | 6.88 |
| APE | 1.42 |
| DPG | 0.38 |
| LPE | 0.91 |
| PG | 0.00 |
| PA | 4.47 |
| LPI | 1.20 |
| PS | 0.00 |
| LPA | 0.56 |
| SPH | 0.00 |
| Others | 0.00 |

The composition is preferably provided in an animal feed as a concentrate with a carrier, such as, silica talc, preferably being included in an amount of 10–40% by weight, more preferably 25%. Alternatively, the composition may be provided in solution.

The present invention will now be further illustrated by means of the following Examples in which Example 1 relates to an investigation into the uptake of the dye 3-[4,5-Dimethylthiazol-2-yl]-2,5diphenyltetrazoliumbromide (MTT) by a monolayer of Vero (monkey kidney) cells using cells treated with a composition of the present invention and cells treated with standard lecithin, Example 2 relates to an in vitro experiment to investigate the permeability of cell plasma membranes using cells which had been treated with a composition of the present invention and cells which had been treated with standard lecithin, by means of treating the respective cells with a media containing radioactive fatty acids and Example 3 relates to an in vivo experiment to determine the increase in daily liveweight gain in pigs fed with a feed supplement containing a composition of the present invention or standard lecithin, and with reference to the accompanying drawings in which:

SUMMARY OF THE INVENTION

Figure 1:
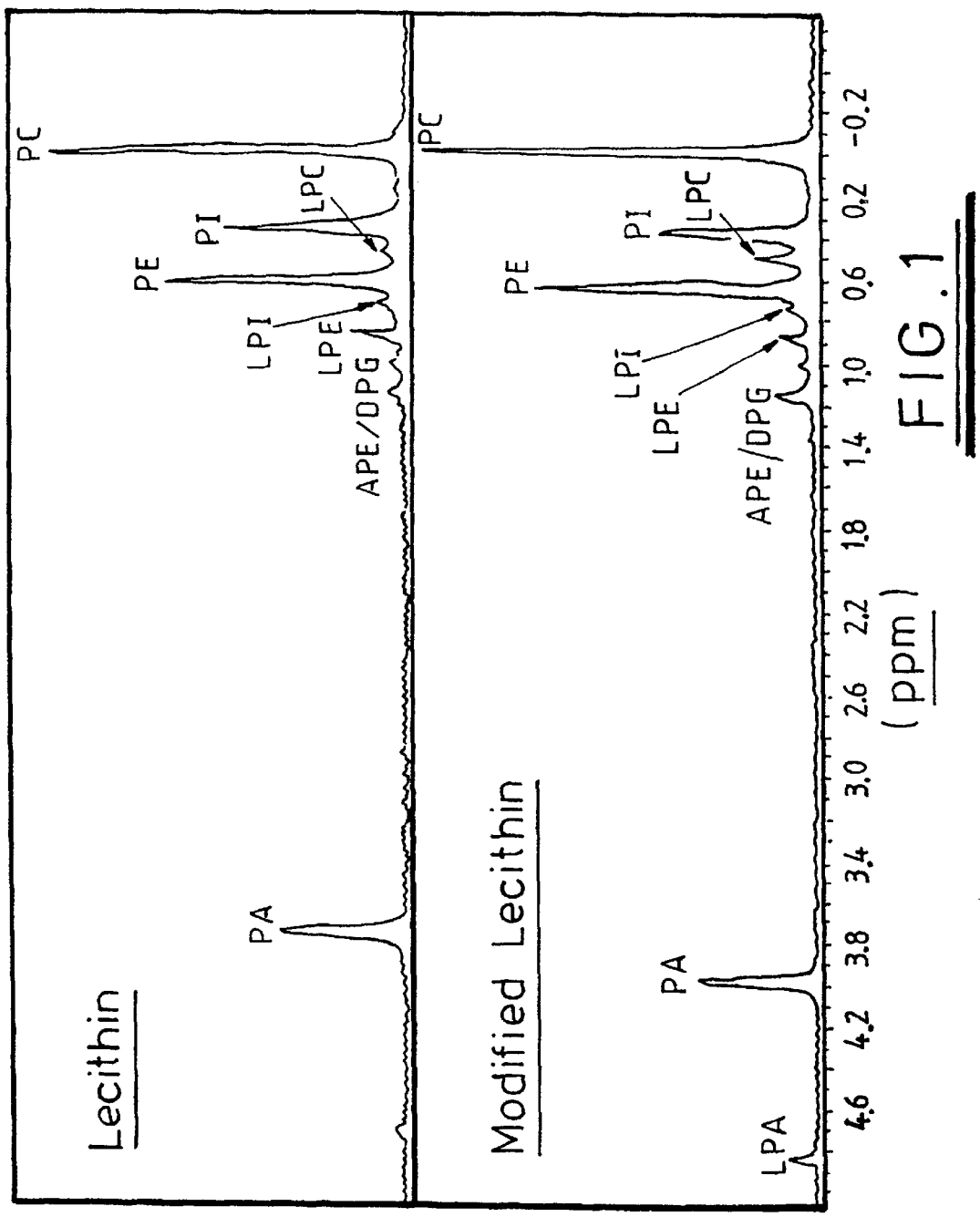
FIG. 1 illustrates respectively the Spectra for Lecithin and for modified lecithin according to the present invention, using phosphorous nuclear magnetic resonance spectroscopy.

The present invention describes a narrow range of ratios and the empirical formula of the most biologically potent lecithins and their use in animal feed formulations.

DETAILED DESCRIPTION OF THE INVENTION

EXAMPLE 1

The rate of uptake of the dye 3-[4,5-Dimethylthiazol-2-yl]-2,5-diphenyltetrazoliumbromide (MTT) by a monolayer of Vero (monkey kidney) cells was measured. MTT is a tetrazolium salt which yields a yellow solution in water. When MTT is taken up by a living cell, dehydrogenase enzymes cleave the tetrazolium ring forming a water insoluble, purple, formazan within the cell. This formazan is solubilized in acidic isopropanol and its absorbance measured spectrophotometrically. The absorbance figure provides an indication of the rate of cellular absorbance, i.e., to determine whether the altered phospholipid ratio of the present invention does increase cellular absorption rates, indicated by more MT being absorbed and metabolised.

Method

Fifteen wells of 6-Well Linbro plates were seeded with Vero cells from a three day culture and incubated overnight under standard conditions in 1 ml Dulbeccos Modified Eagles Media (DMEM) +10% foetal calf serum to provide standard monolayers of cells.

Two ratios of phospholipids, shown in Table 2 below, named Lecithin ratio and Modified lecithin ratio were suspended in Hanks Balanced Salt Solution (HBSS) +4% ethanol to yield a total phospholipid content of 3.9 mg ml$^{-1}$. The Lecithin ratio is that found in unmodified soybean lecithin, the Modified lecithin ratio is that according to the present invention which may be obtained by various techniques such as mixing the synthetically derived pure components together or by enzymes acting on the crude lecithin.

TABLE 2

| Phospholipid Species | Lecithin Ratio | Modified lecithin Ratio |
| --- | --- | --- |
| PC | 13 | 18 |
| PE | 11 | 14 |
| LPC | 0 | 4 |
| LPE | 0 | 1 |
| LPI | 1 | 2 |

Triplicate wells of Vero cell monolayers were then treated with doses of the two ratios, shown in Table 2, for 90 minutes along with a negative control. This yielded a concentration per well of 0.78 or 0.39 mg ml$^-$ total phospholipid. 100 µl of a 5 mg ml$^{-1}$ solution of M was then added to each well and incubated for 30 minutes. The cell monolayers were then washed twice with HBSS and any media removed from the wells. 1 ml of acidified isopropanol was then added to each well and the plates swirled until all purple colouration was dissolved. This solution was then removed and measured spectrophotometrically at 570 nm, with a background reading at 660 nm.

TABLE 3

| Sample Name | Ethanol (µl) | HBSS (µl) | Lecithin Ratio Modified | Modified lecithin Ratio (µl) |
| --- | --- | --- | --- | --- |
| Control | 10 | 240 | 0 | 0 |
| Lecithin 1 | 0 | 125 | 125 | 0 |
| Lecithin 2 | 0 | 0 | 250 | 0 |
| Modified Lecithin 1 | 0 | 125 | 0 | 125 |
| Modified Lecithin 2 | 0 | 0 | 0 | 250 |

The final absorbance readings were obtained by subtracting Abs$_{660nm}$ from Abs$_{570nm}$ and calculating the mean absorbance of the triplicate wells. The calculated figures are shown in Table 4 below.

TABLE 4

| Sample | Mean Absorbance |
| --- | --- |
| Lecithin 1 | 0.14933 |
| Lecithin 2 | 0.16266 |
| Modified lecithin 1 | 0.155 |
| Modified lectihin 2 | 0.1683 |

Comparing the 250 µl doses of Lecithin and Modified lecithin ratios of phospholipids there is an increase of 3.7% in the level of metabolised MTT in the cells treated with the Modified lecithin ratio over that seen in the Lecithin ratio treated cells. A similar increase of 3.5% in the Modified lecithin treated cells is seen with the 125 µl doses. The negative control value shows the cells are not adversely effected by the treatment process. A far greater effect could be seen if the dispersion of the phospholipids in the media could be improved, as quantities of the phospholipids were observed on the surface of the media during the assay. This suggests that the quantity of phospholipid acting on the cells in this assay is far below the stated maximum of 0.78 mg ml$^{-1}$.

Thus, the ratio of different phospholipid species in Modified lecithin according to the present invention has the effect of enhancing cellular absorption over that seen in Lecithin.

EXAMPLE 2

A simple in vitro test was performed to examine the biological properties of the enzyme treated product compared to the substrate lecithin. The enzyme treated product has a similar composition to the synthetic composition used in Example 1. The permeability of the cell plasma membrane to fatty acids was measured by treating cells with lecithin mixtures in media that contained radioactive fatty acids. $C^{14}$ labeled stearic and palmitic acids were both used.

Method

BHK 21 clone cells were cultured in the normal way using G-MEM media supplemented with 10% FBS, 10 ml/L of 200 mM L-Glutamine, 5% TSB and 10 ml/L anti-biotic/antimycotic solution. All reagents were supplied by Sigma Chemicals, Dorset. The cell line was sourced from the European Collection of Animal Cell Cultures at the Centre for Applied Microbiology and Research at Porton Down.

Figure 2:
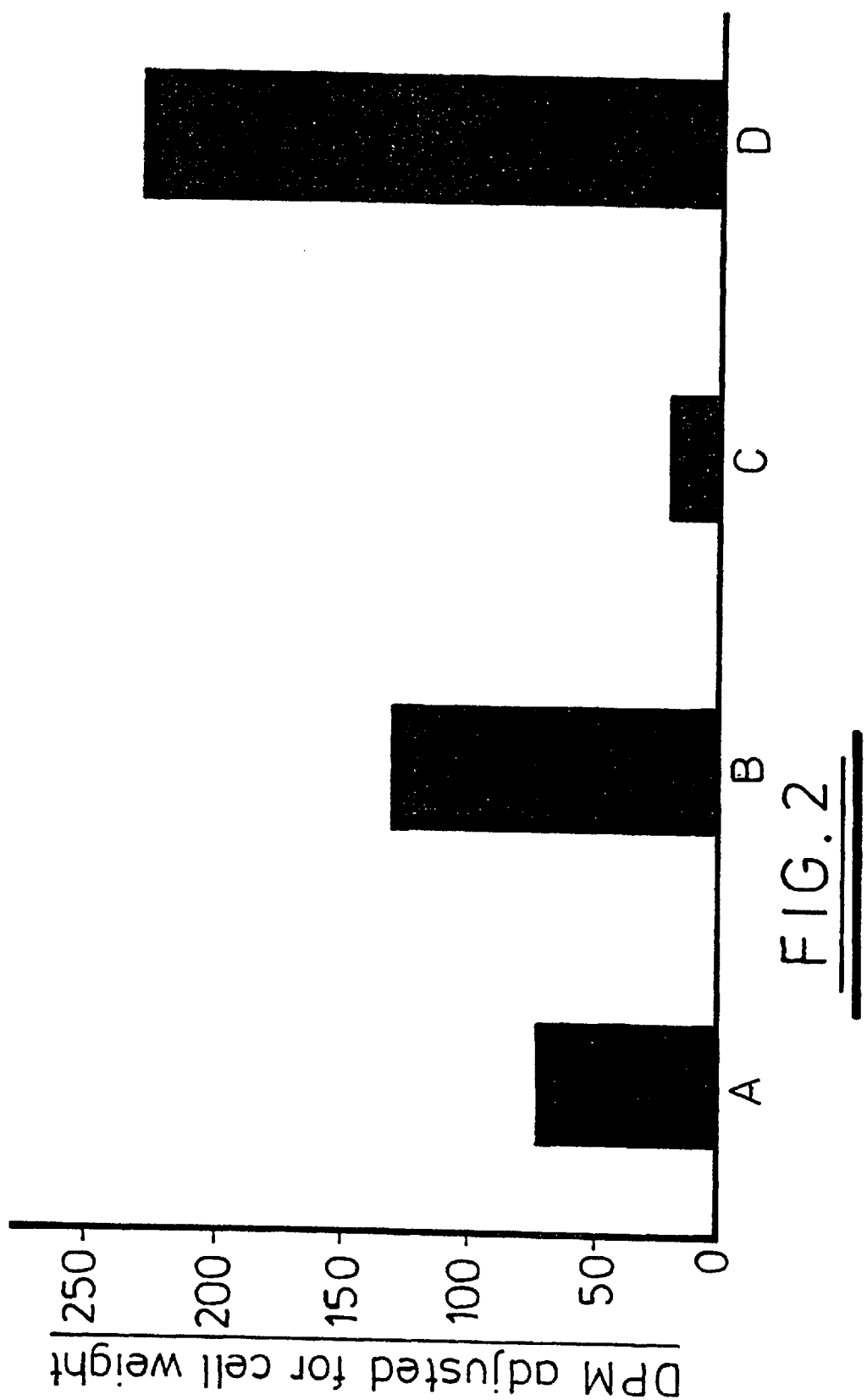
FIG. 2 is a graph illustrating the in vitro effects of lecithin and modified lecithin according to the present invention.

The cells were cultured in 25 cm$^2$ flasks and all experiments were performed in triplicate. Cells in the wells were exposed to 1 µCi of $C^{14}$ stearic and palmitc acid prepared in Hanks' Balanced Salt Solution from a stock 75 µCi stock solution. They were co-exposed to varying concentrations of either lecithin or enzyme treated lecithin. These were prepared using an Ultra-Turrex blender to make up 1% aqueous emulsions. The cultures were left for 1 hour and then the media was removed by aspiration. The adhered cells were then washed twice in Hanks' solution and were then trypsinised using trypsin-EDTA solution. They were then pelleted by centrifuge at 1000 rpm for 5 minutes in preweighted Eppendorf tubes. The cell pellet was then lysed using distilled water and ultrasonic disrupter and left overnight. The Eppendorfs were then re-spun and 100 µl aliquots of the water removed for analysis in a scintillation counter. Sigmafluor was used as the scintillation liquid. Results were converted into DPM per mg cell solids after the Eppendorfs were re-weighed when dry. FIG. 2 of the accompanying drawings shows the mean of three results for each experiment, wherein "A" is lecithin-stearic acid, "B" is enzyme treated lecithin-stearic acid, "C" is lecithin-palmitic acid and "D" is enzyme treated lecithin-palmitic acid, revealing that the enzyme modified lecithin has a similar improvement in activity to the 'synthetic' mixture used in Example 1.

EXAMPLE 3

Six groups of pigs were grown in open pens containing 35 pigs in each. Standard creep diet and '486' type feed (BOCM-Pauls Ltd., England) was used which contained either lecithin or the modified lecithin of the present invention included at a level of 250 g per ton of animal feed. The two types of lecithin were introduced to the feed during production as 25% concentrate in silica talc carrier. Summnary results are shown in Table 5 below.

TABLE 5

|  | Overall Total Lecithin | Overall Total Modified Lecithin |
| --- | --- | --- |
| Pig Days | 4879 | 5055 |
| Weight Gain (Kg) | 1657 | 1821 |
| Total Feed (Kg) | 2725.4 | 2878.5 |
| DLG (g) | 339.6 | 360.2 |
| FCR | 1.645 | 1.581 |

These results translate to an increase in daily liveweight gain in the group fed with the modified lecithin of +6.1%.

The modified lecithin of the present invention has unusual biological properties not found in the substrate material or individual components. The specific compositions as defined herein are recommended for the improvement of growth rates of livestock. Example 1 used the claimed composition formed by adding together synthetically derived pure components whereas Examples 2 and 3 used lecithins which had been modified by enzymes available in the art to produce the claimed composition. The precise empirical formula of the preferred composition of the present invention is given below in Table 6.

TABLE 6

| Phospholipid | Integral | Molecular Weight | Mol % | Weight % |
| --- | --- | --- | --- | --- |
| PC | 83.95 | 770 | 25.63 | 9.69 |
| PI | 63.14 | 835 | 19.27 | 7.90 |
| LPC | 24.62 | 515 | 7.52 | 1.90 |
| PE | 63.29 | 725 | 19.32 | 6.88 |
| APE | 9.59 | 990 | 2.93 | 1.42 |
| DPG | 3.73 | 682.5 | 1.14 | 0.38 |
| LPE | 12.93 | 470 | 3.95 | 0.91 |

TABLE 6-continued

| Phospholipid | Integral | Molecular Weight | Mol % | Weight % |
| --- | --- | --- | --- | --- |
| PG | 0 | 758 | 0.00 | 0.00 |
| PA | 43.5 | 685 | 13.28 | 4.47 |
| LPI | 14.1 | 570 | 4.30 | 1.20 |
| PS | 0 | 772 | 0.00 | 0.00 |
| LPA | 8.73 | 430 | 2.66 | 0.56 |
| SPH | 0 | 770 | 0.00 | 0.00 |
| Others | 0 | 770 | 0.00 | 0.00 |
| Standard | 100 | 326.29 |  |  |
| Totals |  |  | 100.00 | 35.31 |
| Sample weight (mg) | 235.2 |  |  |  |
| Standard weight (mg) | 11.5 |  |  |  |

The increase in quantity of lysophosphatidylcholine, lysophosphatidylethanolamine and lysophosphatidylinositol in specified ratios improves the value of the lecithin as a feed supplement by increasing the rate of cellular absorption in the gut.

It is postulated that activity in the membrane results in changes to the fluidity of the membrane that facilitates passive flux of nutrients into the cell. The prior art composition AL721 was purported to effect the fluidity of cell membranes by modifying cholesterol level in the membrane and thereby the dynamics of the membrane (Intervention in Aging the Development and Application of Active Lipid. Shinitzky, M; Lyte.M;Heron.D and Samuel.D Basic Research & Pre-clinical Screening [1983]NY 175–186). Although this may be one mode of action of the modified lecithin mixture of the present invention it is thought that a more important mode of action is the substitution of the mixture into the membrane thereby directly increasing the motility of the individual phospholipids within the matrix. This may be due to the smaller space occupied by the tail groups of the mono-acyl moieties and the concurrent disturbance of the bonds which serve normally to reinforce the matrix.

The digestive tracks of mammals and fish are composed of surfaces comprising tissue perfused with blood for the purposes of absorption of nutrients and these tissues are made up of individual cells which have plasma membranes which may be affected by these modified lecithins. Thus, when diets containing small amounts of the modified lecithin are fed to animals in experiments the feed is better absorbed into the bloodstream from the digestive system and the field trial results support this mechanistic hypothesis.

I claim:

1. An animal feed supplement comprising a phospholipid composition having the following components in the ratios given:

| Phosphatidylcholine | 18 ± 1 |
| --- | --- |
| Phosphatidylethanolamine | 14 ± 1 |
| Lysophosphatidylcholine | 4 ± 1 |
| Lysophosphatidylethanolamine | 1 ± 1 |
| Lysophosphatidylinositol | 2 ± 1. |

2. An animal feed supplement as claimed in claim 1, wherein the ratio of components is:

| | |
|---|---|
| Phosphatidylcholine | 18 |
| Phosphatidylethanolamine | 14 |
| Lysophosphatidylcholine | 4 |
| Lysophosphatidylethanolamine | 1 |
| Lysophosphatidylinositol | 2. |

3. An animal feed supplement as claimed in claim 1 further comprising additional phospholipids selected from the group consisting of phosphatidyl inositol, diphosphatidyl glycerol, phosphatidic acid, lysophosphatidic acid and acylphosphatidylethanolamine.

4. An animal feed supplement as claimed in claim 3 wherein the phospholipid composition has empirical formula given below:

| Phospholipid | Weight % |
|---|---|
| PC | 9.69 |
| PI | 7.90 |
| LPC | 1.90 |
| PE | 6.88 |
| APE | 1.42 |
| DPG | 0.38 |
| LPE | 0.91 |
| PG | 0.00 |
| PA | 4.47 |
| LPI | 1.20 |
| PS | 0.00 |
| LPA | 0.56 |
| SPH | 0.00 |
| Others | 0.00. |

5. An animal feed supplement as claimed in claim 2 further comprising additional phospholipids selected from the group consisting of phosphatidyl inositol, diphosphatidyl glycerol, phosphatidic acid, lysophosphatidic acid and acylphosphatidylethanolamine.

6. An animal feed supplement as claimed in claim 5 wherein the phospholipid composition has empirical formula given below:

| Phospholipid | Weight |
|---|---|
| PC | 9.69 |
| PI | 7.90 |
| LPC | 1.90 |
| PE | 6.88 |
| APE | 1.42 |
| DPG | 0.38 |
| LPE | 0.91 |
| PG | 0.00 |
| PA | 4.47 |
| LPI | 1.20 |
| PS | 0.00 |
| LPA | 0.56 |
| SPH | 0.00 |
| Others | 0.00. |

\* \* \* \* \*